May 6, 1958 C. R. WILHELMSEN 2,833,870

AUTOMATIC-GAIN-CONTROL SYSTEM

Filed June 26, 1956

2,833,870
Patented May 6, 1958

2,833,870

AUTOMATIC-GAIN-CONTROL SYSTEM

Carl R. Wilhelmsen, Westbury, N. Y., assignor to Hazeltine Research, Inc., Chicago, Ill., a corporation of Illinois Application June 26, 1956, Serial No. 593,843

1 Claim. (Cl. 179—171)

*General*

The present invention is directed to automatic-gain-control systems for signal-translating apparatus and, more particularly, to automatic-gain-control systems employing transistors for use in radio broadcast receivers. Accordingly, the invention will be described in the environment of a radio receiver.

Semiconductor signal-translating devices, commonly referred to as transistors, offer a number of advantages over electron tubes. Their use in both electronic devices and systems is being given widespread attention by equipment designers because of their very small size, lightness of weight, ruggedness, long operating life, extremely simple power requirements, and zero warm-up time. It would seem, therefore, that their use in radio broadcast receivers, particularly in those of the portable type, is extremely desirable.

Automatic-gain-control systems, sometimes referred to as automatic-volume-control systems, are employed in signal-translating apparatus such as radio receivers to maintain the signal input to the modulation-signal detector within a relatively narrow range for a wide range of received signal intensities, thereby minimizing any variations in the intensities of the output signal of the sound reproducer which are caused by atmospheric conditions such as fading or caused by tuning the receiver from a strong broadcasting station to a weaker one. Such systems are conventional in radio receivers employing electron tubes and it is considered desirable to employ them in transistorized radio receivers.

Receivers utilizing electron tubes usually employ diodes as the automatic-gain-control detector devices. The current translated by such a diode is small but, upon flowing through a relatively large resistor, develops sufficient voltage for application to the control electrodes of one or more electron tubes in the intermediate-frequency stages and/or the radio-frequency stages of a receiver. This developed voltage controls the gain of the stages just mentioned with negligible power consumption and maintains the signal input to the modulation-signal detector within a relatively narrow range for a wide range of received signal intensities.

It would initially appear that the techniques employed in automatic-gain-control systems using electron tubes could readily be carried over into automatic-gain-control systems for receivers employing transistors. However, the problem has proved to be quite complex because the input impedance of a transistor is lower than that of an electron tube so that more power must be delivered to the controlled stages employing transistors. The current flowing in the input circuits of the controlled stages is significant and must also be considered. Because of this complexity of the transistor, the use of transistor-type automatic-gain-control systems has been limited.

It is well known that the unidirectional operating potentials applied to a transistor repeater such as an amplifier are small, that is, of the order of a few volts.

These potentials determine the operating region or condition of the repeater. The application of the usual gain-control bias to a transistor repeater may shift the operating region thereof considerably so that the repeater then cannot translate a desired signal without some distortion. This is undesirable for many applications such as in a radio receiver wherein a faithful translation of an applied signal is wanted.

It is an object of the invention, therefore, to provide for use in a signal-translating apparatus a new and improved automatic-gain-control system employing transistors.

It is another object of the invention to provide for use in a transistorized radio receiver a new and improved automatic-gain-control system which is relatively simple in construction and inexpensive to manufacture.

It is a further object of the invention to provide a new and improved transistor-type automatic-gain-control system for a radio receiver which is effective to vary the pass band of the gain-controlled stages of the receiver in accordance with the average amplitude of the received wave signal.

It is an additional object of the invention to provide a new and improved automatic-gain-control system wherein the gain-control bias is applied to a transistor circuit of the system without affecting the operating region of the transistor.

In accordance with a particular form of the invention, an automatic-gain-control system comprises a source of a modulated wave signal, a pair of cascade-coupled transistor repeater circuits coupled to that source for translating that signal, a transistor detector having an input circuit coupled to the aforesaid repeater circuits and having an output circuit and effectively biased to cut-off in the absence of the translated signal for deriving in the aforesaid output circuit a control effect representative of the average amplitude of the modulated wave signal, and a pair of circuits including a pair of variable conductivity means, individual ones of which are effectively coupled in shunt with at least a portion of individual ones of the repeater circuits. The gain-control system also includes control circuit means directly connected between the aforesaid output circuit and the variable conductivity means for applying the aforesaid control effect to the latter to vary the conductivity thereof and the energy translated by the repeater circuits in a sense to maintain the average amplitude of the translated signal within a relatively narrow range for a wide range of intensities of the modulated wave signal.

For a better understanding of the present invention, together with other and further objects thereof, reference is had to the following description taken in connection with the accompanying drawings, and its scope will be pointed out in the appended claims.

Referring to the drawings.

Figure 1:
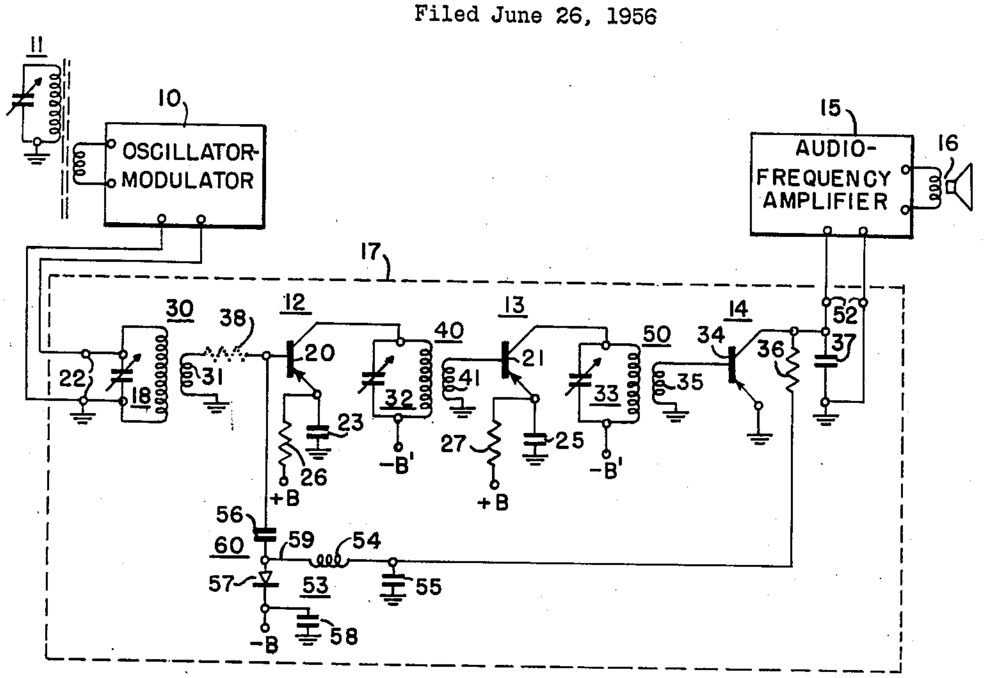
Fig. 1 is a circuit diagram, partly schematic, of a complete radio broadcast receiver which includes an automatic-gain-control system.

*General description of Fig. 1 receiver*

Referring now to Fig. 1 of the drawings, there is represented a complete radio broadcast receiver which utilizes an automatic-gain-control system. In general, the receiver includes a frequency converter or oscillator-modulator 10 having a received wave-signal input circuit constituting an antenna system such as one commonly referred to in the art as a "ferrite-rod antenna" 11 and having its output circuit coupled to an intermediate-frequency amplifier of one or more stages. The intermediate-frequency amplifier preferably includes a pair of cascade or tandem connected stages 12 and 13 which are, in turn, connected in cascade with a modulation-signal detector 14, an audio-frequency amplifier 15, and a sound-reproducing device 16. The oscillator-modulator mentioned above may be of any well-known construction but, when a transistor is employed therein, preferably is of the type described and claimed in the copending application of the applicant and Sylvan Sherman, Serial No. 506,336, filed May 5, 1955, and entitled "Frequency Converter." While the detector 14 may be one of the type for deriving the modulation-signal components of an amplitude-modulated wave signal or one for deriving the modulation-signal components of a frequency-modulated wave signal, for the purpose of describing a particular embodiment of the present invention it will be considered to be a detector for amplitude-modulated wave signals. One or both of the intermediate-frequency amplifier stages 12 and 13 in conjunction with the detector 14 constitute an automatic-gain-control system 17 in accordance with the present invention for deriving a suitable control effect to maintain the amplitude of the signal input to the detector 14 within a relatively narrow range for a wide range of received signal intensities.

It will be understood that the units 10, 11, 15, and 16 just described may be of conventional construction and operation, the details of which are well known in the art so that further detailed description and the operation thereof are unnecessary.

*General aperation of Fig. 1 receiver*

Considering briefly the operation of the Fig. 1 receiver as a whole, but neglecting for the moment the details of the automatic-gain-control portion of the system 17 which will be explained subsequently, a desired amplitude-modulated wave signal intercepted by the antenna 11 is applied to the oscillator-modulator 10 and is converted by the latter to an amplitude-modulated intermediate-frequency wave signal which is translated by the output circuit of unit 10 to the cascade-connected intermediate-frequency amplifier stages 12 and 13 for amplification therein. The output signal of the intermediate-frequency amplifier stage 13 is applied to the detector 14 which derives the audio-frequency modulation components of the received wave signal. These components are, in turn, amplified by the audio-frequency amplifier 15 and are reproduced by the sound-reproducing device 16 in a conventional manner. The automatic-amplification-control or AVC bias derived by the unit 17 in a manner to be explained subsequently is effective to maintain the intensity of the signal input to the detector 14 within a relatively narrow range for a wide range of received signal intensities.

*Description of automatic-gain-control system 17 of Fig. 1*

The automatic-gain-control system 17 for the receiver of Fig. 1 comprises a source of a modulated wave signal preferably having a relatively high Q. To that end the source includes a transformer 30 having a tuned input circuit 18 connected to input terminals 22, 22 which, in turn, are connected to the output circuit of the oscillator-modulator 10. The automatic-gain-control system 17 further comprises a transistor repeater having a linear signal-translating characteristic. This repeater is the intermediate-frequency amplifier 12 and includes a transistor 20 which is base-fed, that is, has an input signal applied to its base connection through the secondary winding 31 of the transformer 30 and a resistor 38. The latter is represented in dotted line construction since it may comprise the effective resistance of the winding 31 and the input or driving circuit for the transistor. A junction transistor is suitable in each of the amplifier environments presently being described. Accordingly, the transistor may employ P-N-P type of semiconductive material or may utilize the N-P-N type thereof. This material may be a suitable semi-conductor such as germanium. The transistors presented for consideration in the automatic-gain-control system 17 of Fig. 1 are of the P-N-P type. It will be understood that the transistors may be of the grown-junction type, the alloy-junction type, or other suitable junction types.

The emitter connection of the transistor 20 is maintained by a condenser 23 at a fixed or ground potential for intermediate-frequency wave signals. The emitter-base circuit of the transistor is biased in the forward direction by a source of positive potential indicated as +B connected to the emitter connection through a resistor 26. The collector connection of the transistor 20 of amplifier 12 is connected through a tuned circuit 32, which is resonant at the intermediate frequency, to a source of potential −B′ which biases the collector in the reverse direction. The two sources +B and −B′ and the elements connecting them to the transistor 20 are effective normally to determine the desired operating region of the transistor.

Connected in cascade with the intermediate-frequency amplifier 12 is a second transistor repeater circuit comprising the intermediate-frequency amplifier 13. Amplifier 13 is similar in construction and arrangement to the amplifier 12. To that end, it is base-fed by way of the secondary winding 41 of the output transformer 40 of unit 12, and circuit elements 25, 27, 33, and 50 serve the same purpose as the corresponding elements of the amplifier 12.

The automatic-gain-control system 17 also includes a detector responsive to the signal translated by amplifiers 12 and 13 for deriving a unidirectional control effect representative of the average amplitude of the modulated wave signal applied to the input terminals 22, 22 of the system. Preferably, this detector is a detector-amplifier 14 which includes a transistor 34 that is base-fed by the secondary winding 35 of the output transformer 50 of amplifier 13. The emitter connection of the transistor 34 is grounded directly so that the transistor is biased substantially to cutoff in the absence of a modulated wave signal supplied by the amplifier 13. The collector connection of transistor 34 is coupled to the ungrounded one of a pair of output terminals 52, 52 which are coupled to the input circuit of the audio-frequency amplifier 15. An intermediate-frequency by-pass condenser 37 is connected across the terminals just mentioned. The detector 14 has a filter network 53 comprising a series-connected choke winding 54 and a shunt-connected audio-frequency by-pass condenser 55 connected to the collector connection through a resistor 36. The parameters of the units 12, 13, and 14 are selected so that the control effect derived across the output terminals of the filter network 53 is substantially greater than the maximum amplitude of the modulated wave signal applied to the intermediate-frequency amplifier 12.

Figure 2:
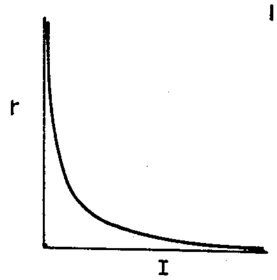
Fig. 2 is a characteristic curve of a portion of the gain-control system of Fig. 1.

The automatic-gain-control system 17 further includes a circuit 60 including in cascade a coupling condenser 56 and a variable conductivity means, the latter preferably being a junction diode 57, effectively coupled in shunt with at least a portion of the repeater circuit or intermediate-frequency amplifier 12. A representative portion of the intermediate-frequency amplifier 12 comprises its input circuit. To that end, the remote terminal of condenser 56 is connected to the base connection of the transistor 20 while the corresponding terminal of the diode 57 is coupled to a source indicated as −B and is further connected to ground through an intermediate-frequency by-pass condenser 58. The source just mentioned serves to bias the collector connection of the transistor 34 of the detector-amplifier 14 in the reverse direction. The diode 57 is one having a small signal alternating-current resistance $r$ which is inversely proportional to the direct-current biasing current I flowing therethrough, the characteristic of the diode being represented by the curve of Fig. 2.

The automatic-gain-control system 17 additionally includes control circuit means coupled to the detector 14 and the diode 57 for applying the control effect developed by the detector across the output terminals of filter network 53 to the diode to vary its conductivity, the energy translated by the intermediate-frequency amplifier 12 in a sense to maintain the average amplitude of the translated signal within a relatively narrow range for a wide range of intensities of the modulated wave signal, and the pass band of the tuned circuit 18 directly with the average amplitude of the modulated wave signal. This means comprises the connection 59 between the output terminal of the filter network 53 and the junction of the condenser 56 and the diode 57.

*Explanation of operation of automatic-gain-control system 17 of Fig. 1*

Neglecting for the moment the action of the circuit 60, when an intermediate-frequency wave signal is applied to the input terminals 22, 22 of the system 17, it is amplified in a conventional manner by the intermediate-frequency amplifier stages 12 and 13 and applied to the detector 14, thus causing a flow of emitter current in the latter. The emitter-base circuit of the transistor 34 effectively acts as a diode and rectifies the positive-going components of the amplitude-modulated wave signal applied thereto, and the derived modulation components thus produced are amplified by the action of the transistor as a whole so that the amplified components are translated by the collector circuit to the audio-frequency amplifier 15.

Considering now the influence of the control circuit means 60 effectively connected in shunt with the input circuit of the intermediate-frequency amplifier 12, it will be assumed that a modulated wave signal of increasing average amplitude is being applied to the input terminals 22, 22. This signal tends to cause the average amplitude of the audio-frequency signal appearing at the collector circuit of the detector-amplifier 14 to increase. This signal of greater intensity, after being smoothed by the filter network 53 to develop at the output terminals of the latter a control effect of increasing magnitude, renders the junction diode 57 more conductive, thereby creating a greater flow of current therethrough. This increased current decreases the alternating-current resistance of the diode in the manner represented by the exponential curve of Fig. 2. As a result, the conductivity of the alternating-current shunt path comprising circuit 60 is increased and the intermediate-frequency energy translated to the collector circuit of amplifier 12 is reduced in a sense which tends to maintain the average amplitude of the signal translated thereby within a relatively narrow range for a wide range of intensities of the applied modulated wave signal. This causes the amplitude of the signal applied to the second intermediate-frequency amplifier 13 to increase more slowly than the increase in the amplitude of the received signal and, in turn, keeps the average amplitude of the signal applied to the detector-amplifier 14 by the intermediate-frequency amplifier 13 within a relatively narrow range for a wide range of intensities of the modulated wave signal. The increased conductivity of the control circuit means 60 presents a lower impedance to intermediate-frequency wave signals applied to the input circuit of transistor 20 with its coupling circuits including the tuned circuit 18. This lowers the Q of these coupling circuits and increases the pass band of the amplifier 12 in the well-known manner. Thus, for received signals of large amplitude, the amplifier 12 of the system 17 has its greatest band width.

If a modulated wave signal of lower or decreasing average amplitude is applied to the input terminals 22, 22 of the system 17, it tends to produce an audio-frequency signal of lower average intensity at the output terminals 52, 52 and a corresponding control effect of lower intensity at the output terminals of the filter network 53 for application to junction diode 57. This increases the conductivity of the diode and the reduced current flow therethrough increases the alternating-current resistance of the diode. Consequently, the conductivity of the alternating-current shunt path comprising the condenser 56 and the diode 57 is decreased in a sense which tends to increase the drive to the input circuit of amplifier 12 in a sense to maintain the average amplitude of the signal translated thereby to the detector-amplifier 14 within a relatively narrow range for a wide range of intensities of the received modulated wave signal. The reduced conductivity of the shunt path including circuit 60 increases the Q of the tuned circuit 18 and narrows the pass band thereof. Since this restricted pass band occurs for applied signals of low average amplitude, the signal-to-noise ratio for marginal-level signals applied to the system 17 is improved. Thus, the automatic-gain-control system is effective to open up the pass band of the signal-translating channel for applied wave signals of large amplitude when the signal-to-noise ratio is not critical, and desirably to restrict the pass band and increase the signal-to-noise ratio when weak or marginal-level signals are being translated.

As previously mentioned, the unidirectional potentials +B and −B′ applied to the emitter and the collector connections, respectively, of the transistor 20 determine the operating region of the transistor. Since the junction diode 57 is isolated for unidirectional potentials from the transistor circuit by the coupling or blocking condenser 56, the relatively large unidirectional potential variations which may be experienced by the diode do not affect the operating potentials and operating region of the transistor. Also, since the unidirectional control effect supplied by the filter 53 to the diode 57 is large with respect to the maximum amplitude of the alternating-current input signal applied to the input circuit of the transistor from unit 10, that alternating potential has relatively little effect on the conductivity of the diode. The amplifier 12 is therefore permitted faithfully to translate an applied intermediate-frequency wave signal.

Figure 3:
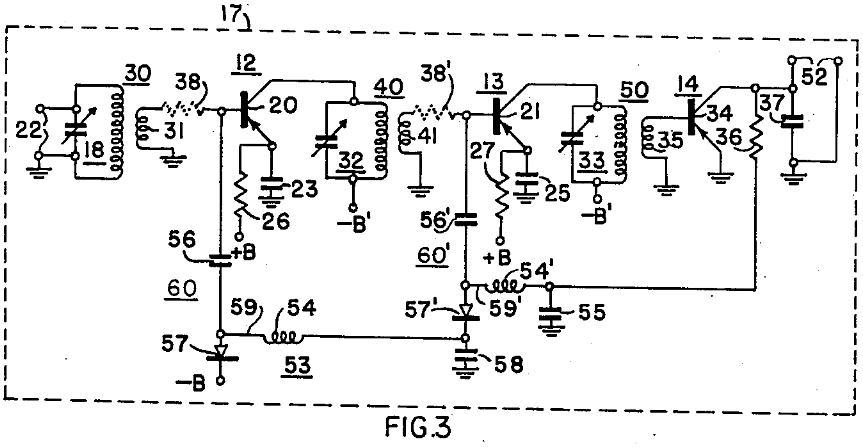
Fig. 3 is an automatic-gain-control system in accordance with the invention and is a modification of the one represented in Fig. 1.

*Description and explanation of operation of Fig. 3 gain-control system*

Referring now to Fig. 3 of the drawings, there is represented a modified form of the automatic-gain-control system of Fig. 1. The corresponding elements are designated therein by the same reference numerals while similar elements are designated by the same reference numerals primed. The system of Fig. 3 differs from that of Fig. 1 in that the input circuit of the intermediate-frequency amplifier 13 also includes a control circuit of variable conductivity coupled in shunt therewith. The collector electrode of the transistor 34 is biased in the reverse direction by the source −B which is connected thereto through a path including the junction diode 57, conductor 59, choke winding 54, junction diode 57′, conductor 59′, choke winding 54′, and the resistor 36. The condenser 58 is an intermediate-frequency by-pass condenser.

The operation of the Fig. 3 system is essentially the same as that of Fig. 1 and need not be repeated. An intermediate-frequency wave signal applied to the input terminals 22, 22 causes the detector-amplifier 14 to draw collector current which is by-passed for audio frequencies by the condenser 55 and flows from the source −B through the junction diodes 57′ and 57 and through the choke windings 54′ and 54. This current modulates the resistance of the junction diodes and the impedance of the circuits 60 and 60' shunting the input circuits of the amplifiers 12 and 13. Overloading effects similar to that which occurs when applying a gain-control potential to a sharp cutoff thermionic pentode are not possible in the system 17 since the operating biases applied to the amplifiers 12 and 13 are not disturbed and the signal currents in the diode 57 are always small relative to the variations in the unidirectional control current.

Figure 4:
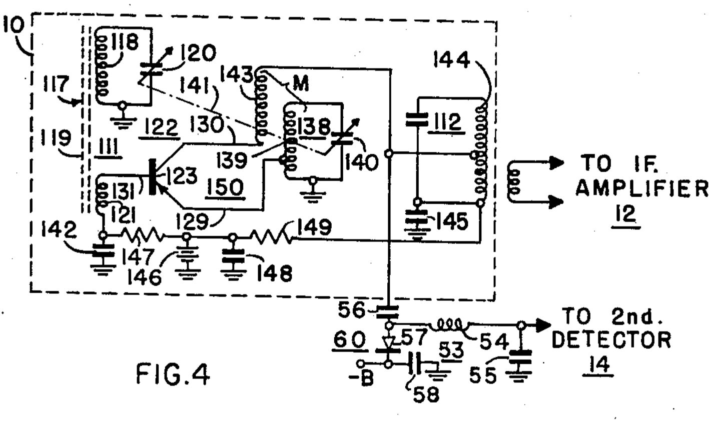
Fig. 4 is a modified automatic-gain-control system.

*Description of automatic-gain-control system of Fig. 4*

Referring now more particularly to Fig. 4 of the drawings, the system there represented includes a frequency converter of the autodyne type such as is disclosed and claimed in the copending application of applicant and Sylvan Sherman, Serial No. 506,336, and filed May 5, 1955. Elements represented in the frequency converter of Fig. 4 are designated by the same reference numerals employed in Fig. 1 of the above-mentioned application but with the addition of 100. Reference is made to that application for a complete description and explanation of the operation thereof. The frequency converter 110 includes a ferrite-rod antenna system 117 in its tuned input circuit 111. A winding 121 on the ferrite rod 119 of the antenna system is magnetically coupled to a winding 118 thereon which is tuned by an adjustable condenser 120. A junction transistor 122 is preferably employed and includes a body 123 of semiconductive material of the N–P–N type. The body 123 of transistor 122 is one which presents an inherent internal resistance between the base connection 131 and the effective internal base terminal of the semiconductive body 123 which is large with relation to inherent internal impedance between that terminal and the emitter connection 129.

The frequency converter 110 includes a regenerative oscillatory circuit 150 comprising the transistor 122 and a tuned circuit 138 which includes a winding 139 tuned to the frequency of the local oscillations by the condenser 140. The latter is arranged for unicontrol operation with the condenser 120 of the input circuit 111 by suitable means represented by the broken line 141. The emitter connection 129 of the transistor is connected to a low alternating-current point of the winding 139 so that the emitter is effectively at ground for unidirectional potentials. Radio-frequency input signals are applied to the frequency converter 110 between the base and emitter connections 131 and 129, respectively, by the winding 121 in the input circuit of the regenerative oscillatory system 150. One terminal of the winding just mentioned is connected to the base connection 131 while its other terminal is connected to ground through a radio-frequency by-pass condenser 142 which has a substantial impedance at the frequency of the local oscillations developed in the tuned circuit 138.

A tickler winding 143 of the regenerative oscillatory system is preferably tightly coupled to winding 138 and is connected in the output circuit of the frequency converter 110 between the collector connection 130 and the emitter connection 129 through the series combination of the low alternating-current portion of winding 144 of the tuned output circuit 112 through an intermediate-frequency by-pass condenser 145. The inductive coupling between the windings 143 and 139, which is represented by the reference character M and its associated bracket, serves to provide feedback of energy comprising the amplified local oscillations to the resonant circuit 138 so that local oscillations tend to be maintained therein. Accordingly, the transistor 122 and its associated circuits are intended to serve as the local oscillator for the frequency converter 110. For the embodiment of the invention under consideration, the local oscillator including its tuned circuit 138 is arranged to develop free oscillations having a frequency within the range of 1–2 megacycles. Consequently, the beat frequency of the intermediate-frequency signal, which appears in the tuned output circuit 112 coupled between the emitter and collector connections and is derived by virtue of the nonlinear signal-translating characteristic of the frequency converter 110, has a frequency of about ½ megacycle.

The frequency converter 110 also includes biasing means which may be in the form of a battery 146 for supplying a bias voltage in the forward direction between the emitter and base connections 129 and 131 and for supplying a bias voltage in the reverse direction between the collector and base connections 130 and 131. Since the transistor is one of the N–P–N type, the positive terminal of the battery is connected to the base connection 131 through a current-limiting resistor 147 and the winding 121 while the negative terminal of the battery is connected to ground. The resistor 147 and the condenser 142 are proportioned in the well-known manner to constitute a self-biasing means for the transistor. A radio-frequency by-pass condenser 148 is connected in parallel with the battery 146 and the positive terminal of the battery is also connected to the collector connection 130 through the resistor 149, a portion of winding 144, and the winding 143. The resistor 149 and the condenser 145 constitute decoupling elements which are chosen so that the power dissipated in the collector circuit can not exceed a safe operating value.

The automatic-gain-control system of Fig. 4 also comprises a circuit 60 including a condenser 56 and a junction diode 57 which are connected across a portion of the winding 144 of the tuned intermediate-frequency output circuit 112 of the frequency converter 110. The source —B and the filter network 53 are arranged for connection to the second detector 14 in exactly the same manner represented in connection with Fig. 1.

*Operation of automatic-gain-control system of Fig. 4*

Considering now the operation of the gain-control system of Fig. 4, the biases which are established on the transistor 122 are such that the frequency converter 110 is permitted to operate as an autodyne or oscillatory detector. The transistor 122 and its associated circuits generate local oscillations which appear as amplified oscillations in the output circuit between the collector connection 130 and ground and are fed back to the input circuit between the emitter and base connections by the feed-back or tickler winding 143 which is inductively coupled to the resonant circuit 138. The nonlinear translating characteristic of the regenerative oscillatory circuit is such that it functions as a heterodyne detector and derives heterodyne components in the output circuit between the collector connection and ground. The heterodyne difference components are selected by the resonant circuit 112 which is inductively coupled to the input circuit of the intermediate-frequency amplifier.

The modulation components derived by the second detector 14 are filtered by network 53 and applied to the junction diode 57 to control the conductivity thereof and the shunting action of circuit 60 across a portion of the tuned intermediate-frequency output circuit 112 of the frequency converter 110. The conductivity imparted to the junction diode 57 by the control effect developed across the output terminals of the filter network 53 controls the gain of the frequency converter and the energy translated thereby in a sense which will maintain the average amplitude of the translated or intermediate-frequency wave signal within a relatively narrow range for a wide range of intensities of the modulated wave signal intercepted by the antenna system 117. This translating action is effected without appreciably affecting the amplitude of the local oscillations developed by the regenerative oscillatory circuit 150 of the frequency converter. Consequently, the local oscillator does not block over any portion of the operating range of the frequency converter 110 in the manner experienced by some transistor converters when radio-frequency signals of large amplitude are applied thereto and cause the automatic-gain-control system of prior receivers to develop a strong gain-control bias.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

An automatic-gain-control system comprising: a source of a modulated wave signal; a pair of cascade-coupled transistor repeater circuits coupled to said source for translating said signal; a transistor detector having an input circuit coupled to said repeater circuits and having an output circuit and effectively biased to cutoff in the absence of said translated signal for deriving in said output circuit a control effect representative of the average amplitude of said modulated wave signal; a pair of circuits including a pair of variable conductivity means individual ones of which are effectively coupled in shunt with at least a portion of individual ones of said repeater circuits; and control circuit means directly connected between said output circuit and said variable conductivity means for applying said control effect to the latter to vary the conductivity thereof and the energy translated by said repeater circuits in a sense to maintain the average amplitude of said translated signal within a relatively narrow range for a wide range of intensities of said modulated wave signal.

References Cited in the file of this patent

UNITED STATES PATENTS

| | | |
|---|---|---|
| 1,958,998 | Hentschel | May 15, 1934 |
| 2,273,639 | Haantjes | Feb. 17, 1942 |
| 2,774,866 | Burger | Dec. 18, 1956 |

OTHER REFERENCES

"Transistor Broadcase Receiver," by Stern and Raper; Electrical Engineering December 1954, pp. 1107–1112.

"Miniature Transistor Radio," in Electronic Design, December 1954, p. 20.

"Crystal Triodes," by James and Wells, British Institute of Radio Engineering, May 1952, pp. 285–294.